2,850,537

PROCESS FOR MAKING 3-HALO-4-NITROPHENOLS

Wesley C. Stoesser and Willard M. Gentry, Midland, Mich., assignors to The Dow Chemical Company, Midland, Mich., a corporation of Delaware No Drawing. Application April 23, 1956
Serial No. 579,754

6 Claims. (Cl. 260—622)

This invention concerns a new process for making 3-halo-4-nitrophenols. It relates more particularly to a process for making 3-halo-4-nitrophenols from tris-(3-halophenyl)phosphates.

It is known to prepare 3-chloro-4-nitrophenol by nitrating 3-chlorophenol. For instance, Hodgson and Moore, J. Chem. Soc. (London) vol. CXXVII, p. 1600, 1925, make 3-chloro-4-nitrophenol and 3-chloro-6-nitrophenol in yields of 60 percent (crude) and 22 percent, respectively, by nitrating 3-chlorophenol at temperatures below 25° C. with a mixture of concentrated sulfuric acid and an aqueous solution of sodium nitrate. Ungnade and Ortega, J. Org. Chem., vol. 17, p. 1480, 1952, obtained a 48.2 percent yield of 3-chloro-4-nitrophenol and a 14.6 percent yield of 3-chloro-6-nitrophenol by reacting nitric acid with 3-chlorophenol at a temperature of —15° C. in glacial acetic acid.

The prior methods have the disadvantages that the yield of 3-chloro-4-nitrophenol is undesirably low, and the formation of an appreciable quantity of by-product 3-chloro-6-nitrophenol in the reaction makes it difficult to recover the 3-chloro-4-nitrophenol.

It has now been discovered that 3-halo-4-nitrophenols such as 3-chloro-4-nitrophenol or 3-bromo-4-nitrophenol can readily be prepared in good yield by a procedure which involves nitrating a tris-(3-halophenyl)phosphate to obtain a corresponding tris-(3-halo-4-nitrophenyl)phosphate and hydrolyzing the latter to yield the corresponding 3-halo-4-nitrophenol, as hereinafter described.

It has been found that nitrating a tris-(3-halophenyl) phosphate such as tris-(3-chlorophenyl)phosphate or tris-(3-bromophenyl)phosphate in admixture with concentrated sulfuric acid and hydrolyzing the tris-(3-halo-4-nitrophenyl)phosphate thus obtained results in appreciably greater yields of the 3-halo-4-nitrophenol than has heretofore been obtainable by known methods, and in a form which can readily be separated from the hydrolysis mixture. The invention results in a correspondingly lower yield of the by-product 3-halo-6-nitrophenol.

The tris-(3-halophenyl)phosphates to be employed as starting materials are tris-(3-chlorophenyl)phosphate and tris-(3-bromophenyl)phosphate. They can readily be prepared by reaction of 3-chlorophenol or 3-bromophenol with phosphorus oxychloride or phosphorus oxybromide in known ways.

It is important that the nitrating reaction be carried out in admixture with sulfuric acid and under strong nitrating conditions. The nitrating reaction can be carried out in admixture with strong sulfuric acid, i. e. sulfuric acid in a concentration betwen 90 and 100, preferably from 94 to 100, percent, and in amount such that the ratio of sulfuric acid to water, including that formed in the reaction, is at least 8 to 1 and preferably is within the range of from 9 to 1 to 20 to 1 parts by weight of the sulfuric acid per part of the total water to be present upon completion of the reaction. The employment of the sulfuric acid in a ratio lower than that specified usually results in precipitation of the tris-(3-halo-4-nitrophenyl) phosphate from the solution and forms an unmanageable mass. The sulfuric acid is usually employed in a concentration of from 94 to 98 percent by weight, e. g. the usual commercial grade, and in amount corresponding to from about 4 to 11 moles of the sulfuric acid per mole of the tris-(3-halophenyl)phosphate initially used.

The nitric acid can be employed in amount corresponding to from 2.7 to 3.3 preferably about three gram molecular proportions of the nitric acid per gram molecular proportion of the tris-(3-halophenyl)phosphate starting material, and in anhydrous or substantially anhydrous condition such that the ratio of total water and sulfuric acid in the reaction mixture is within the range previously stated. The nitric acid can be employed in concentrated form, e. g. in a concentration of from 95 to 100 percent, or generated in situ by reaction of the sulfuric acid with an alkali metal nitrate such as sodium nitrate, potassium nitrate or lithium nitrate, or preferably as a mixture of the nitric acid and sulfuric acid. The nitric acid is usually employed as a mixture of the same with sulfuric acid in proportions of from 10 to 50, preferably from 40 to 50, percent by weight of the nitric acid and from 90 to 50, preferably from 60 to 40 percent, of the sulfuric acid, e. g. the usual grade of commercially available mixed acids employed for nitrating purposes.

The nitrating reaction can be carried out at temperatures between —10° and 20° C., preferably from 0° to 10° C., and at atmospheric pressure or thereabout.

In practice, the tris-(3-halophenyl)phosphate starting material is mixed with or dissolved in concentrated sulfuric acid in the desired proportions. The mixture is stirred and maintained at temperatures below 20° C. Thereafter, nitric acid is added portionwise or gradually, and preferably as a solution of the nitric acid in sulfuric acid, in the desired amount. The resulting mixture is usually stirred and maintained at temperatures between 0° and 10° C. for a short time to complete the nitrating reaction. Upon completion of the nitrating reaction, the mixture is usually diluted with water in amount sufficient to form with the sulfuric acid a solution containing from 20 to 70, preferably from 40 to 60, weight percent of sulfuric acid, based on the sum of the weights of the sulfuric acid and the water in the mixture. The resulting aqueous acidic mixture is heated, preferably with agitation, at temperatures betwen 120° and 150° C. and at atmospheric or superatmospheric pressures to hydrolyze the tris-(3-halo-4-nitrophenyl)phosphate to the corresponding 3-halo-4-nitrophenol.

It is important that the hydrolysis of the tris-(3-halo-4-nitrophenyl) phosphate be carried out in admixture with the diluted aqueous reaction mixture in which it was formed containing the sulfuric acid in a concentration corresponding to from 20 to 70, preferably from 40 to 60, weight percent in order to obtain good yields of the 3-halo-4-nitrophenol product. At lower concentrations of the sulfuric acid hydrolysis of the tris-(3-halo-4-nitrophenyl)phosphate is difficult and proceeds at an undesirably slow rate, and at concentrations of the sulfuric acid greater than about 70 percent there is a tendency toward sulfonation of the tris-(3-halo-4-nitrophenyl)phosphate or the 3-halo-4-nitrophenol.

The hydrolysis is preferably carried out at atmospheric pressure or thereabout employing the diluted aqueous acidic nitration reacted mixture containing the sulfuric acid in a concentration between 40 and 60 percent, based on the sum of the weights of the sulfuric acid and the total water in the mixture and heating of the mixture under refluxing conditions. The reaction can be carried out under the autogeneous pressure of the mixture of the materials, or a higher pressure and at temperatures within the range of from 120° to 150° C.

The product, i. e. the 3-halo-4-nitrophenol, is recovered from the aqueous acidic hydrolyzed mixture by cooling the same to crystallize the product and filtering or decanting the liquid or by dissolving the product in a water-immiscible organic solvent such as benzene, toluene, xylene, chlorobenzene, ethylene dichloride, etc., in which case the product is recovered from the solvent in usual ways, e. g. by crystallization.

In an alternate procedure, the tris-(3-halo-4-nitrophenyl)phosphate can be separated from the reaction mixture in which it is formed and then hydrolyzed, e. g. by treatment with an aqueous solution of sulfuric acid or an aqueous solution of sodium hydroxide, but such procedure is less satisfactory and is not required.

The products of the invention have been found to be useful as fungicides or parasiticides, and are particularly useful in the control of aquatic parasites.

The following examples illustrate ways in which the principle of the invention has been applied, but are not to be construed as limiting its scope.

*Example 1*

A charge of 7,102 grams (16.58 moles) of tris-(3-chlorophenyl)phosphate was added with stirring to 16,181 grams of 95 percent by weight of concentrated sulfuric acid maintained at temperatures between 2° and 10° C. Thereafter, a charge of 6,187 grams of mixed acids consisting of 47.5 percent by weight of nitric acid and 51.6 percent of sulfuric acid containing 0.9 percent of water, was added over a period of 6.5 hours. The mixture was stirred and maintained at temperatures between 2° and 5° C. for 20 minutes longer, then was gradually mixed with 10.45 liters of water. The resulting mixture became warm and was heated under refluxing temperatures of up to 136° C. for a period of two hours, then was allowed to cool to room temperature. The mixture separated into an upper solid layer and a lower liquid layer. The liquid layer was separated. The liquid layer was extracted with 7.8 kg. of chlorobenzene. The chlorobenzene extract was added to the solid, together with 25 kg. of chlorobenzene. The resulting mixture was warmed to a temperature of 100° C. A small amount of aqueous liquid was separated. The remaining solution was cooled. A crystalline material separated. The crystals were separated by filtering, were washed and dried. There was obtained 6,639 grams (38.3 moles) of 3-chloro-4-nitrophenol as pale yellow crystals melting at 118°–120° C. The yield of said product was 77 percent based on the tris-(3-chlorophenyl)phosphate initially used.

*Example 2*

A charge of 1,111 grams (1.97 moles) of tris-(3-bromophenyl)phosphate was added with stirring to 1,746 grams of 94.7 percent concentrated sulfuric acid maintained at a temperature below 20° C. The mixture was cooled to temperatures between 5° and 10° C. A charge of 791 grams of mixed acids, consisting of 47.6 percent by weight of nitric acid, 51.6 percent of sulfuric acid and 0.8 percent of water, was added slowly over a period of 3 hours while maintaining the mixture at temperatures between 5° and 10° C. The mixture was stirred for a period of 20 minutes longer, then mixed with 1,170 ml. of water. The resulting diluted mixture was heated at temperatures between 130° and 140° C. for a period of 2 hours to hydrolyze the tris-(3-bromo-4-nitrophenyl)phosphate. Thereafter, the mixture was cooled and allowed to stand. It separated into an upper acidic layer and a lower product layer. The acidic layer was decanted and was extracted by washing the same with 1,000 grams of chlorobenzene. This chlorobenzene extract, together with an additional 1,000 grams of chlorobenzene, was added to the product layer and the resulting mixture heated and stirred to form a solution. The solution was washed with water until free from sulfuric acid. The solution was dried by heating the same to distill water, together with a portion of the chlorobenzene therefrom. The remaining solution was cooled to room temperature to crystallize the product. The crystalline product was separated by filtering, was washed and dried. There was obtained 1,025 grams (4.7 moles) of 3-bromo-4-nitrophenol as crystals melting at 130°–132° C. The yield of said product was 79.5 percent based on the tris-(3-bromophenyl)phosphate initially used.

*Example 3*

A charge of 20 grams of tris-(3-chlorophenyl)phosphate, together with 73.4 grams of concentrated sulfuric acid (94%) was placed in a glass reaction flask equipped with a reflux condenser and stirrer. The mixture was stirred and maintained at temperatures between 0° and 10° C. while adding 9.5 grams of fuming nitric acid (80%) thereto over a period of about 15 minutes. The mixture was stirred for 5 minutes longer. Thereafter, 340 grams of water was added. The resulting mixture was sealed in a pressure resistant glass bottle and heated with agitation in an oil bath at a temperature of 140° C. to hydrolyze the tris-(3-chloro-4-nitrophenyl)phosphate to 3-chloro-4-nitrophenol, then allowed to cool. The contents of the bottle were removed and extracted with about twice its volume of chlorobenzene. The aqueous acidic layer was discarded. The chlorobenzene solution was concentrated by distilling a portion of the chlorobenzene therefrom. The residue was cooled to crystallize the product. The crystals were separated by filtering and were dried. There was obtained 3-chloro-4-nitrophenol in a yield corresponding to 72 percent based on the tris-(3-chlorophenyl)phosphate initially used.

We claim:

1. In a process for making a 3-halo-4-nitrophenol, the steps which consist in reacting approximately one molecular proportion of a tris-(3-halophenyl)phosphate selected from the group consisting of tris-(3-chlorophenyl)phosphate and tris-(3-bromophenyl)phosphate, and three molecular proportions of nitric acid at temperatures between −10° and 20° C. while having the reactants dissolved in concentrated sulfuric acid in amount such that the ratio of sulfuric acid to water, including that theoretically possible upon completion of the reaction, is at least 8 parts by weight of the sulfuric acid per part of the water, to obtain a corresponding tris-(3-halo-4-nitrophenyl)phosphate, and hydrolyzing the tris-(3-halo-4-nitrophenyl)phosphate by heating the same in an aqueous acidic medium containing from 20 to 70 weight percent of sulfuric acid, based on the sum of the weights of the sulfuric acid and the total water in the mixture, at hydrolysis temperatures between 120° and 150° C. to yield the corresponding 3-halo-4-nitrophenol.

2. A process for making a 3-halo-4-nitrophenol which comprises reacting approximately one molecular proportion of a tris-(3-halophenyl)phosphate selected from the group consisting of tris-(3-chlorophenyl)phosphate and tris-(3-bromophenyl)phosphate, and three molecular proportions of nitric acid at temperatures between −10° and 20° C. while having the reactants dissolved in concentrated sulfuric acid in amount such that the ratio of sulfuric acid to water, including that theoretically possible upon completion of the reaction, is at least 8 parts by weight of the sulfuric acid per part of the water, to obtain a corresponding tris-(3-halo-4-nitrophenyl)phosphate, then diluting the reacted mixture with water in amount sufficient to form with the sulfuric acid a solution containing from 20 to 70 weight percent of sulfuric acid, based on the sum of the weights of the sulfuric acid and the total water in the mixture, and heating the resulting mixture at hydrolysis temperatures between 120° and 150° C. to yield the corresponding 3-halo-4-nitrophenol.

3. A process as claimed in claim 2, wherein the tris-(3-halophenyl)phosphate is tris-(3-chlorophenyl)phosphate.

4. A process as claimed in claim 2, wherein the tris- (3-halophenyl)phosphate is tris-(3-bromophenyl)phosphate.

5. A process for making 3-chloro-4-nitrophenol which comprises reacting approximately one molecular proportion of tris-(3-chlorophenyl)phosphate and three molecular proportions of nitric acid at reaction temperatures between −10° and 20° C. while having the reactants dissolved in sulfuric acid having a concentration between 94 and 100 weight percent in amount corresponding to at least 4 gram molecular proportions of the sulfuric acid per gram molecular proportion of the tris-(3-chlorophenyl)phosphate, diluting the reacted mixture with water in amount sufficient to form with the sulfuric acid a solution containing from 40 to 60 weight percent of the sulfuric acid, based on the sum of the weights of the sulfuric acid and the total water in the mixture and heating the resulting mixture at temperatures between 120° and 150° C. to yield 3-chloro-4-nitrophenol.

6. A process for making 3-bromo-4-nitrophenol which comprises reacting approximately one molecular proportion of tris-(3-bromophenyl)phosphate and three molecular proportions of nitric acid at reaction temperatures between −10° and 20° C. while having the reactants dissolved in sulfuric acid having a concentration between 94 and 100 weight percent in amount corresponding to at least 4 gram molecular proportions of the sulfuric acid per gram molecular proportion of the tris-(3-bromophenyl)phosphate, diluting the reacted mixture with water in amount sufficient to form with the sulfuric acid a solution containing between 40 and 60 weight percent of the sulfuric acid based on the sum of the weights of the sulfuric acid and the total water in the mixture and heating the resulting mixture at temperatures between 120° C. and 150° C. to yield 3-bromo-4-nitrophenol.

References Cited in the file of this patent

Rapp, Annalen, vol. 224 (1884), pp. 159–163 (5 pp.; entire article pp. 156–178).

Groggins, "Unit Processes in Organic Synthesis" (4th ed., 1952), pp. 3, 4, 35–39 (7 pp.), pub. by McGraw-Hill Book Co., N. Y.